Patented Oct. 21, 1952

2,615,052

UNITED STATES PATENT OFFICE 2,615,052

2,2'-METHYLENEBIS(4-CHLORO-6-NITROPHENOL) AND A METHOD FOR ITS PRODUCTION

Herman E. Faith, New Palestine, Ind., assignor to Allied Laboratories, Inc., Kansas City, Mo., a corporation of Delaware No Drawing. Application June 23, 1950, Serial No. 170,033

2 Claims. (Cl. 260—619)

The present invention relates to the compound 2,2'-methylenebis(4-chloro-6-nitrophenol) and a method for its production.

In accordance with the present invention, it has been discovered that the compound 2,2'-methylenebis(4-chloro-6-nitrophenol) possesses valuable properties which render it useful in the preparation of more complex organic derivatives. My new compound also possesses antifungal properties and anthelmintic properties and, hence, can be used in the preparation of medicaments.

The process for the preparation of my new compound will be described in the following specific example—it being understood that the example is by way of illustration and not limitation.

Preparation of 2,2'-methylenebis(4-chloro-6-nitrophenol)

Sixty-eight grams of 2,2'-methylenebis(4-chlorophenol) are dissolved in 550 ml. of glacial acetic acid and 33.8 g. of fuming nitric acid (d. 1.5) in 50 ml. of glacial acetic acid are added gradually. The temperature is kept at 10–15° C. during the addition; then the mixture is stirred at 25–30° C. for 1.5 hours. It is cooled and the product is collected by filtration. It is then crystallized from glacial acetic acid. M. P. 181–182° C. It is soluble in toluene and crystallized from ethanol, methanol, and propanol.

I claim:

1. The compound 2,2'-methylenebis(4-chloro-6-nitrophenol).

2. The process for the preparation of the compound 2,2'-methylenebis(4-chloro-6-nitrophenol) which comprises treating 2,2'-methylenebis(4-chloro-phenol) with nitric acid in glacial acetic acid.

HERMAN E. FAITH.

REFERENCES CITED

The following references are of record in the file of this patent:

UNITED STATES PATENTS

| Number | Name | Date |
|---|---|---|
| 2,192,197 | Mills et al. | Mar. 5, 1940 |

OTHER REFERENCES

Dahmer, Annalen Der Chemie (German), vol. 333, p. 365 (1904).

Short et al., Jour. Chem. Soc. (British), vol. 117, p. 523 (1920).